(12) United States Patent
Casagrande

(10) Patent No.: US 10,177,808 B2
(45) Date of Patent: Jan. 8, 2019

(54) COMMUNICATION PROCESS AND SYSTEM FOR HIGH-SENSITIVITY AND SYNCHRONOUS DEMODULATION SIGNALS

(71) Applicant: The Swatch Group Research and Development Ltd, Marin (CH)

(72) Inventor: Arnaud Casagrande, Bole (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/486,720

(22) Filed: Apr. 13, 2017

(65) Prior Publication Data

US 2017/0324442 A1   Nov. 9, 2017

(30) Foreign Application Priority Data

May 4, 2016   (EP) .................................. 16168392

(51) Int. Cl.
*H04B 1/7073* (2011.01)
*G01S 11/08* (2006.01)
(Continued)

(52) U.S. Cl.
CPC ............ *H04B 1/7073* (2013.01); *G01S 11/08* (2013.01); *H04L 7/042* (2013.01); *H04L 27/103* (2013.01);
(Continued)

(58) Field of Classification Search
CPC ... H04L 7/042; H04L 27/1566; H04L 27/103; H04B 1/7073
(Continued)

(56) References Cited

U.S. PATENT DOCUMENTS

| 4,037,159 A | 7/1977 | Martin | |
| 7,177,343 B1 * | 2/2007 | Citta | H04B 1/69 375/139 |

(Continued)

FOREIGN PATENT DOCUMENTS

| CN | 102724155 A | 9/2014 |
| CN | 102724155 B | 9/2014 |

OTHER PUBLICATIONS

European Search Report dated Oct. 17, 2016 in European Application 16168392.5 filed on May 4, 2016 (with English Translation of Categories of Cited Documents).

*Primary Examiner* — Michael Neff
(74) *Attorney, Agent, or Firm* — Oblon, McClelland, Maier & Neustadt, L.L.P.

(57) ABSTRACT

The communication process for high-sensitivity and synchronous demodulation signals between a transmitter (2) and a receiver (3) comprises a first synchronisation phase followed by a modulation and demodulation phase of the data. To achieve this, the transmitter transmits a pseudo-periodic chirp signal to the receiver, where a frequency conversion of the chirp signal is performed in a mixer (33) by an oscillating signal (So) at constant frequency of a local oscillator (34) to supply an intermediate signal, which is filtered and sampled for a logic unit (37). An assembly (38) of m pairs DFT blocks phase-shifted in relation to one another and operating in parallel is provided in the logic unit. A processing unit (39) receives the result of the pairs of the assembly to determine frequency and phase errors between the transmitter and the receiver on the basis of two peaks detected by one of the pairs above a threshold to synchronise the receiver.

25 Claims, 6 Drawing Sheets

(51) Int. Cl.
   *H04L 27/10* (2006.01)
   *H04L 7/04* (2006.01)
   *H04L 27/156* (2006.01)
   *H04B 1/69* (2011.01)

(52) U.S. Cl.
   CPC .. *H04L 27/1566* (2013.01); *H04B 2001/6912* (2013.01)

(58) Field of Classification Search
   USPC .......................................................... 375/139
   See application file for complete search history.

(56) References Cited

U.S. PATENT DOCUMENTS

| | | | |
|---|---|---|---|
| 8,861,568 B2 * | 10/2014 | Petersen | G01S 11/08 375/139 |
| 2013/0129026 A1 | 5/2013 | Petersen | |
| 2014/0375499 A1 | 12/2014 | Petersen | |

* cited by examiner

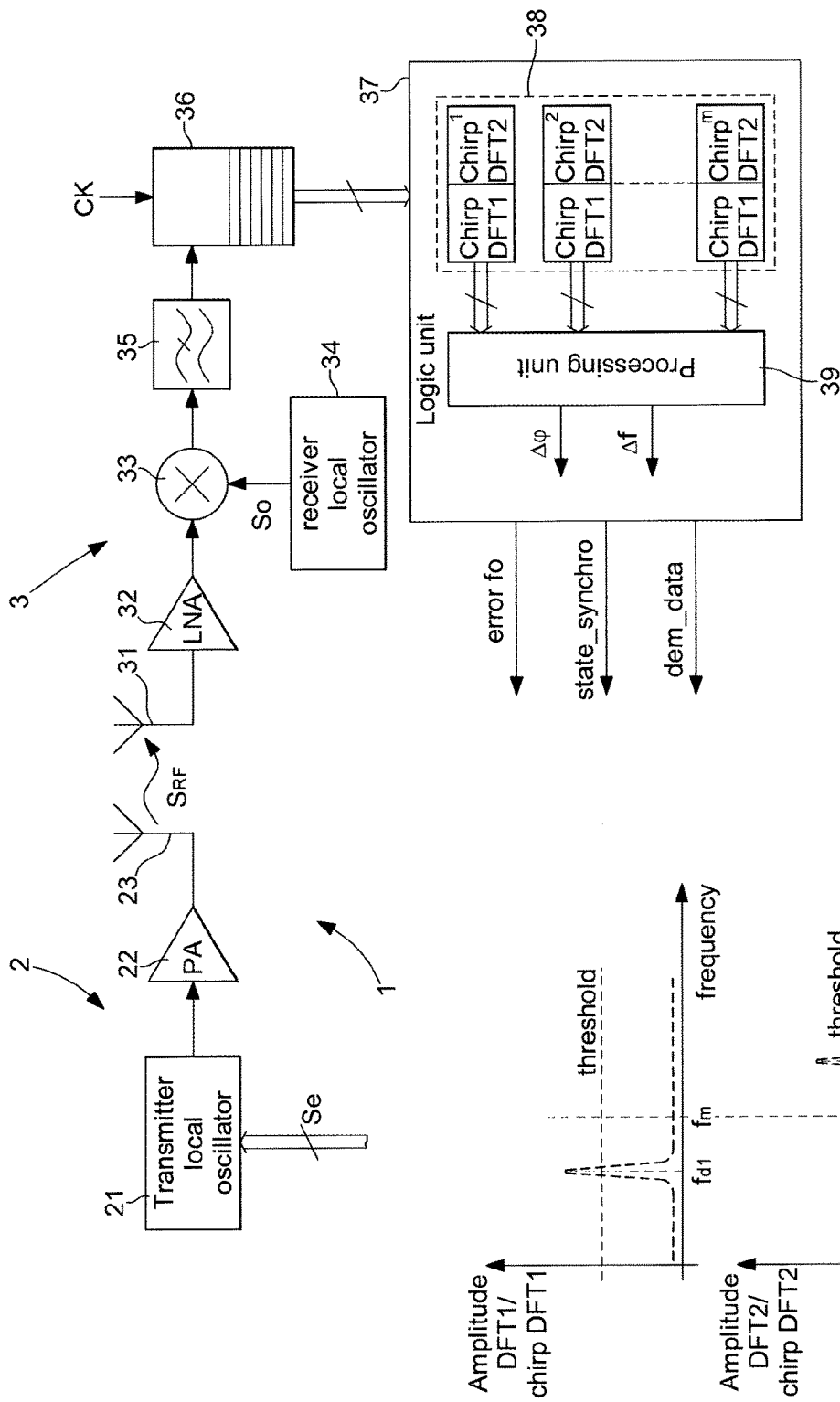

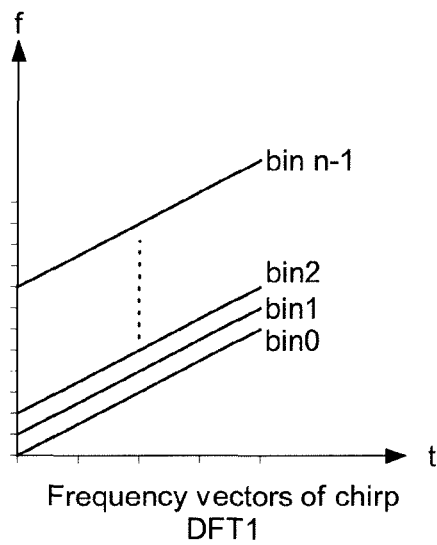
Frequency vectors of chirp
DFT1
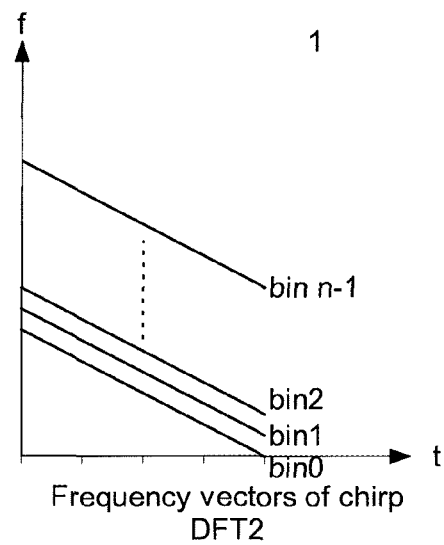
1
Frequency vectors of chirp
DFT2
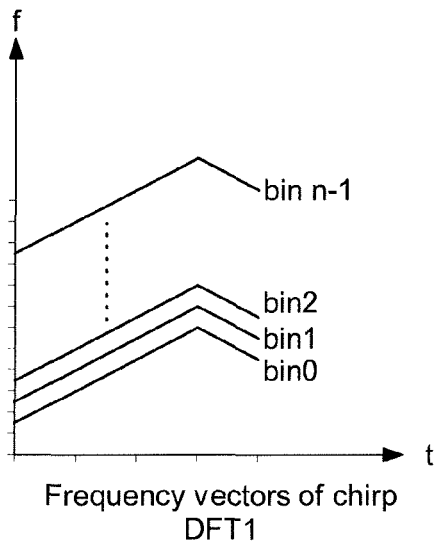
Frequency vectors of chirp
DFT1
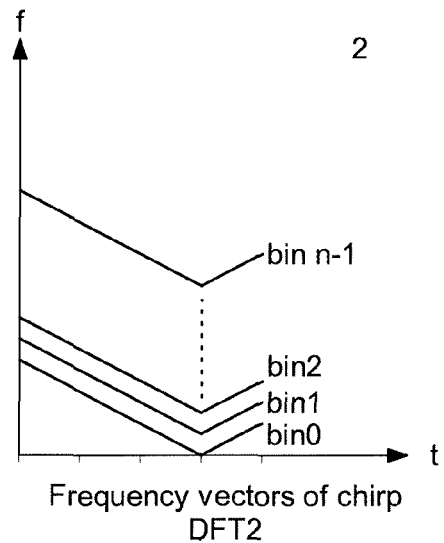
2
Frequency vectors of chirp
DFT2
Fig. 5

COMMUNICATION PROCESS AND SYSTEM FOR HIGH-SENSITIVITY AND SYNCHRONOUS DEMODULATION SIGNALS

This application claims priority from EP No. 16168392.5 filed on May 4, 2016, the entire disclosure of which is hereby incorporated herein by reference.

FIELD OF THE INVENTION

The invention relates to a process for the communication of high-sensitivity and synchronous demodulation signals.

The invention also relates to a communication system for implementing the process for the communication of high-sensitivity and synchronous demodulation signals.

BACKGROUND OF THE INVENTION

In a data or command communication system it may be desirable to conduct a communication at low rate by using a transmission spread spectrum. This makes it possible to optimise the resistance of the communication system to different disruptors. The communication system can preferably be based on a "chirp" type spread spectrum modulation. The chirp signal is by definition a pseudo-periodic signal modulated in frequency around a carrier frequency. In general, the frequency of this chirp signal varies linearly in relation to the carrier frequency between a low value and a high value of the frequency band. A first half-cycle of this signal can be a positive slope of linear frequency variation, whereas a successive second half-cycle of this signal can be with a negative slope of linear frequency variation.

The patent application US 2014/0064337 A1, which describes a process for synchronisation of a receiver on the base of a chirp signal transmitted by a transmitter, can be cited in this context. The clock signal of the receiver has to be synchronised initially with the clock signal of the transmitter to perform a data communication. To achieve this, the receiver captures the chirp signal from the transmitter. The receiver is configured to receive a chirp signal with at least one first frequency variation gradient in a half-cycle having an amplitude higher than 1. The receiver comprises a correlator suitable for correlating the first frequency variation gradient of the chirp signal with a first expected chirp signal to produce a first set of correlation results. At least one first correlation peak above the other correlation peaks is determined to be able to estimate the frequency and/or phase deviation. An adjustment unit is also provided to correct the phase and frequency of the first chirp signal of the receiver and thus be synchronised with the transmitter. However, the receiver does not perform a discrete Fourier transform (or DFT) of the sampled intermediate signal to enable the frequency or phase deviations to be found quickly. Therefore, this constitutes a disadvantage in enabling synchronisation to be made easier and the general consumption of the receiver to be reduced.

SUMMARY OF THE INVENTION

Therefore, the aim of the invention is to propose a communication process for high-sensitivity and synchronous demodulation signals that remedies the disadvantages of the prior art while allowing a simple synchronisation, low frequency and with a good reduction in electric power consumption.

For this purpose, the invention relates to a communication process for high-sensitivity and synchronous demodulation signals in a communication system, which comprises at least one transmitter for transmitting a pseudo-periodic chirp-type signal of period T and at least one receiver to receive the chirp signal, wherein the transmitter comprises a local oscillator of the transmitter to generate a chirp signal to be transmitted and the receiver comprises a local oscillator of the receiver suitable for generating an oscillating signal for the frequency conversion of the received chirp signal by a mixer to supply an intermediate signal, wherein the process comprises a synchronization phase followed by a modulation or demodulation phase of a data signal, wherein the synchronization phase, the transmitter transmits a chirp signal, which in each period T of linear frequency variation is composed of a first cycle portion with a positive slope of linear frequency variation and a second successive cycle portion with a negative slope of linear frequency variation, wherein the receiver receives the chirp signal and converts the frequency of this chirp signal in the mixer by means of the oscillating signal generated by the local oscillator of the receiver in order to produce the intermediate signal, wherein the frequency of the oscillating signal is constant so that the frequency variation of the intermediate signal is the image of the frequency variation of the chirp signal, wherein a filtered and sampled intermediate signal is supplied to a logic unit of the receiver, which comprises an assembly of m pairs of discrete Fourier transform blocks arranged for an operation in parallel and phase-shifted in relation to one another, where m is a whole number higher than or equal to 1, wherein a first block of each pair is intended for the acquisition in relation to the positive slope of frequency variation of the chirp signal, whereas a second block of each pair is intended for the acquisition in relation to the negative slope of frequency variation of the chirp signal, and wherein a processing unit of the logic unit receives the result of each discrete Fourier transform of the pairs of the assembly following at least one acquisition of the chirp signal and determines a frequency and/or a phase error between the transmitter and the receiver on the basis of two peaks detected by at least one pair of the assembly above a defined noise threshold to synchronize the receiver before the demodulation phase of the data.

For this purpose, the invention relates to a communication process for high-sensitivity and synchronous demodulation signals in a communication system, which comprises at least one transmitter for transmitting a pseudo-periodic chirp-type signal of period T and at least one receiver to receive the chirp signal, wherein the transmitter comprises a local oscillator of the transmitter to generate a chirp signal to be transmitted and the receiver comprises a local oscillator of the receiver suitable for generating an oscillating signal for the frequency conversion of the received chirp signal by a mixer to supply an intermediate signal, wherein the process comprises a synchronization phase followed by a modulation or demodulation phase of a data signal, wherein the synchronization phase, the transmitter transmits a chirp signal, which in each period T of linear frequency variation is composed of a first cycle portion with a positive slope of linear frequency variation and a second successive cycle portion with a negative slope of linear frequency variation, wherein the receiver receives the chirp signal and converts the frequency of this chirp signal in the mixer by means of the oscillating signal generated by the local oscillator of the receiver in order to produce the intermediate signal, wherein the frequency of the oscillating signal varies in a similar manner to the frequency variation of the chirp signal, wherein a filtered and sampled intermediate signal is supplied to a logic unit of the receiver, which comprises a pair of discrete Fourier transform DFT blocks, wherein a first block of the pair is intended for the acquisition in relation to the positive slope of frequency variation of the chirp signal, whereas a second block of the pair is intended for the acquisition in relation to the negative slope of frequency variation of the chirp signal, and wherein a processing unit of the logic unit receives the result of each discrete Fourier transform of the blocks of the pair to correct the phase-shift of the oscillating signal generated by the local oscillator after several successive acquisitions of the chirp signal until detection by the pair of DFT blocks of two peaks above a defined noise threshold to determine a frequency and/or a phase error between the transmitter and the receiver to synchronize the receiver before the demodulation phase of the data.

Particular steps of the process are mentioned in dependent claims 3 to 23.

One advantage of the process lies in the fact that according to a first embodiment, the receiver enables the chirp signal captured by an oscillating signal of the local oscillator of the receiver, which is at constant frequency, to be firstly converted in frequency. This frequency conversion allows an intermediate signal to be obtained that has a frequency variation similar to that of the captured chirp signal. A filtered and sampled intermediate signal is supplied to a logic unit, which comprises an assembly of pairs of "chirp" discrete Fourier transform blocks where the vector projection base has a modulated frequency characteristic. The pairs of "chirp" discrete Fourier transform blocks are phase-shifted in relation to one another, for which each vector base of the different DFTs is phase-shifted. All the DFT pairs work in parallel on each data acquisition. After an acquisition, peaks above a noise threshold are detected, and this enables quick calculation of a mean of the frequency abscissas to determine a frequency error. A phase error is also determined, being equal to the distance between one of the peaks and the mean of the frequencies of the detected peaks.

One advantage of the process lies in the fact that according to a second embodiment, the receiver enables the chirp signal captured by an oscillating signal of the local oscillator of the receiver, which is at modulated frequency to the image of the chirp signal, to be firstly converted in frequency. Each acquisition of data is conducted between each beginning and end of a frequency variation cycle of the chirp signal in the receiver. The receiver is provided to regularly change the phase of the triangular frequency modulation or variation until the oscillating signal supplied by the oscillator to the mixer comes sufficiently close to the phase of the chirp signal. To achieve this, two discrete Fourier transforms are conducted in the logic unit of the receiver. A first discrete Fourier transform is conducted for the positive slope of the oscillating signal during a first portion of the frequency variation cycle. A second discrete Fourier transform is conducted for the negative slope of the oscillating signal during a second portion of the frequency variation cycle. The first and second portions of the frequency variation cycle are preferably identical and constitute half-cycles of the frequency variation cycle. After several acquisitions, peaks above a noise threshold are determined by a processing unit connected to the DFT blocks to correct the phase shift of the oscillating signal. Moreover, a frequency error as well as a phase error are determined, as in the first embodiment of the communication process.

Advantageously, the synchronisation phase according to the first or second variants of the communication process is short compared to the synchronisation of the receipt of GPS positioning signals.

Advantageously, significant changes in frequency are mainly carried out continuously and generally without any major interruption. This thus enables the band width of the frequency synthesiser used in the local oscillator to be limited effectively. Thus, the modulator and demodulator used for the synthesiser of the oscillator can be a simple low-frequency PLL sigma-delta modulator and demodulator having a single-point frequency modulation. This configuration topology is particularly simple and oriented towards low consumption.

Moreover, in the specific case where the frequency of the local oscillator of the receiver is modulated, the interferences associated with the parasitic radiation of the local oscillator are effectively distributed over a large band width, thus simplifying the design of the receiver.

Advantageously, in the modulation and demodulation phase, a coding of data is conducted in the chirp signal by adding a frequency offset to each half-cycle. By way of example, in a first half-cycle on the positive slope of frequency variation, a constant frequency offset can be added to define a logic state "1", whereas for a second half-cycle on the negative slope of frequency variation, a constant frequency offset is withdrawn to define a logic state "0".

Advantageously, in the modulation and demodulation phase, a coding of data can be provided with asymmetric frequency slopes in each half-cycle of the chirp signal. In each half-cycle of the chirp signal following the synchronisation phase, therefore, each logic state is defined by a first positive slope of frequency variation followed by a second negative slope of frequency variation, which is different in absolute values from the first positive slope. For example, a logic state "1" in a first half-cycle of the chirp signal is defined by a first positive slope of frequency variation larger than the second negative slope of frequency variation in absolute values. A logic state "0" in the second half-cycle of the chirp signal is defined by a first positive slope of frequency variation smaller than the second negative slope of frequency variation in absolute values. With this type of data coding, there is no abrupt frequency change, which is advantageous.

For this process, the invention relates to a communication system for implementing the communication process, wherein it comprises at least one transmitter or transmitting a pseudo-periodic chirp-type signal of period T and at least one receiver to receive the chirp signal, wherein the transmitter comprises a local oscillator of the transmitter to generate a chirp signal to be transmitted and the receiver comprises a local oscillator of the receiver suitable for generating an oscillating signal at constant frequency for the frequency conversion of the received chirp signal by a mixer to supply an intermediate signal with frequency variation at the image of the captured chirp signal, wherein it additionally comprises a low-pass filter followed by a sampler timed by a timing signal supplied by the local oscillator of the receiver, wherein it additionally comprises a logic unit, which comprises an assembly of m pairs of discrete Fourier transform blocks arranged for an operation in parallel and phase-shifted in relation to one another, where m is an integral higher than or equal to 1, wherein a first block of each pair is intended for the acquisition in relation to the positive slope of frequency variation of the chirp signal, whereas a second block of each pair is intended for the acquisition in relation to the negative slope of frequency variation of the chirp signal, and wherein the logic unit additionally comprises a processing unit intended to receive the result of each discrete Fourier transform of the pairs of the assembly to determine a frequency and/or a phase error between the transmitter and the receiver.

For this purpose, the invention relates to a communication system for implementing the communication process, wherein it comprises at least one transmitter for transmitting a pseudo-periodic chirp-type signal of period T and at least one receiver to receive the chirp signal, wherein the transmitter comprises a local oscillator of the transmitter to generate a chirp signal to be transmitted and the receiver comprises a local oscillator of the receiver suitable for generating an oscillating signal at constant frequency for the frequency conversion of the received chirp signal by a mixer to supply an intermediate signal with frequency variation at the image of the captured chirp signal, wherein it additionally comprises a low-pass filter followed by a sampler timed by a timing signal supplied by the local oscillator of the receiver, wherein it additionally comprises a logic unit, which comprises a pair of discrete Fourier transform DFT blocks, wherein a first block of the pair is intended for the acquisition in relation to the positive slope of frequency variation of the chirp signal, whereas a second block of the pair is intended for the acquisition in relation to the negative slope of frequency variation of the chirp signal, and wherein the logic unit additionally comprises a processing unit intended to receive the result of the discrete Fourier transforms of the blocks of the pair to correct the phase-shift of the oscillating signal generated by the local oscillator to determine a frequency and/or a phase error between the transmitter and the receiver.

BRIEF DESCRIPTION OF THE FIGURES

The aims, advantages and features of the communication process and system for signals of high-sensitivity and synchronous demodulation will become clearer in the following description with respect to the drawings:

FIG. 3 shows a first practical example of the communication system for implementing the first variant of the communication process according to the invention;

FIG. 4 shows an example of the peaks above a noise threshold of the output signals of a pair of m pairs of discrete Fourier transform blocks of chirp DFT1 and chirp DFT2 of positive and negative frequency ramps for the communication process according to the invention;

FIG. 5 shows several graphs over time of the frequency ramps of n projection vectors of the chirp-type discrete Fourier transforms DFT1 and DFT2 for the communication process according to the invention;

DETAILED DESCRIPTION OF THE INVENTION

In the following description all the components of the communication system in particular for implementing the communication process for signals of high-sensitivity and synchronous demodulation, which are well known to a person skilled in the art in this technical field are only described in a simplified manner.

In the communication process principally two phases are conducted, which are a first phase of synchronisation and a second phase of demodulation. A first synchronisation phase is firstly conducted before the data transmission from the transmitter. In this first phase, there is an adaptation of the phase and the frequency of the signal generated in a local oscillator of the receiver in relation to the chirp signal received from a transmitter. This local oscillator comprises a quartz crystal resonator linked to a frequency synthesiser, which supplies an oscillating signal in particular for the operation of frequency conversion of the captured chirp signal.

It should firstly be noted that the local quartz crystal oscillator of the transmitter is similar to the local quartz crystal oscillator of the receiver. Therefore, the oscillation frequency is largely similar to ±40 ppm and it is above all a matter of adapting the phase shift between the transmission and reception signals as well as the frequency deviation between the frequency variation of the signal of the transmitter and that of the receiver.

During the synchronisation phase, the exact frequency and the phase of the transmission module are therefore determined. At the end of this synchronisation phase and during the demodulation phase, the data transmitted by the transmitter are received by the receiver. The exact phase of the transmitter is tracked to allow any frequency deviation between the quartz crystal resonator of the transmitter and that of the receiver to be absorbed.

Figure 1:
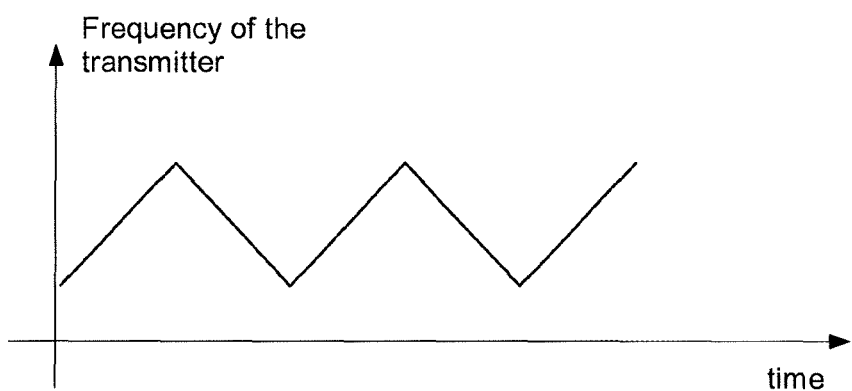
FIG. 1 shows a chirp-type signal of variable frequency, which can be transmitted by a transmitter of the communication system.

FIG. 1 shows a simplified view of a chirp signal transmitted by a transmitter of the communication system. This chirp signal is pseudo-periodic being modulated in frequency around a carrier frequency, e.g. in the order of 2.4 GHz, and can also be modulated in amplitude. In the shown case, a modulation of the frequency is preferably sought, which varies linearly over time between a low frequency value and a high frequency value around the carrier frequency. The shape of the frequency of the chirp signal over time is triangular. The distance between the low and high values, which can be in the order of 100 Hz or more, defines the frequency band around the carrier frequency for a defined spread-spectrum transmission. With a large band width of the received signals, this makes it possible to prevent all the disruptors and also to have a high sensitivity of the received signals of low flow rate, e.g. in the order of 1 kbits/s.

Figure 2:
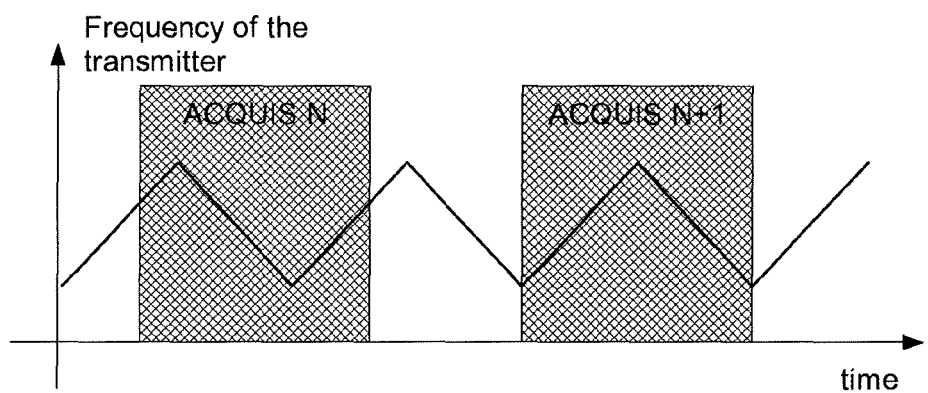
FIG. 2 shows the chirp-type signal of the transmitter and at least two acquisitions in series over time in the receiver of the communication system according to a first variant of the communication process of the invention.

FIG. 2 shows the chirp signal with triangular-shaped frequency variation over time that has been transmitted by the transmitter of the communication system in the synchronisation phase of the receiver according to a first variant of the communication process. According to this particular case, the frequency variation of the chirp signal is linear with an increasing positive slope in a first half-cycle and with a decreasing negative slope in a second half-cycle. The positive slope can be equal to the negative slope in absolute values, but can also be different, as explained below in particular during the modulation of data. For this first variant of the communication process, the frequency of the oscillating signal supplied by the local oscillator of the receiver is kept constant at a frequency deviation of the carrier frequency of the received chirp signal.

As shown briefly for the communication process according to the first variant, the receiver is able to conduct a series of successive acquisitions ACQUIS N and ACQUIS N+1. These two acquisitions each have a duration of a period T of frequency variation of the received chirp signal. The successive acquisitions are shifted in time without synchronisation, i.e. the time delay of acquisitions of the intermediate signal IF is constantly phase-shifted.

FIG. 3 actually shows a first practical example of the communication system 1 for implementing the communication process according to the first variant. The communication system 1 firstly comprises at least one transmitter 2 and at least one receiver 3 for establishing a communication of data by radiofrequency signals SRF of a carrier frequency higher than MHz and preferably around 2.4 GHz.

The transmitter 2 principally comprises a local oscillator 21 of the transmitter, which can comprise a quartz crystal linked to a frequency synthesiser (not shown) for the modulation in frequency of data, as explained below with reference to FIGS. 8 and 9. To achieve this, the local oscillator 21 of the transmitter receives a control signal Se for generation of a chirp signal of determined carrier frequency and, for example, with a triangular linear frequency variation over time. The chirp signal passes through a power output amplifier (PA) 22 for transmission of a chirp-type radiofrequency signal SRF through an antenna 23.

The receiver 3 firstly comprises an antenna 31 to be able to receive a chirp radiofrequency signal SRF and a low-noise amplifier (LNA) 32 to amplify and filter the captured signal to be supplied to a mixer 33. A frequency conversion is conducted by the mixer 33 with an oscillating signal So supplied by a local oscillator 34 of the receiver. For this first practical example, the oscillating signal supplied by the local oscillator 34 is at a constant value frequency corresponding to a defined frequency deviation at the carrier frequency of the captured chirp radiofrequency signal.

This local oscillator 34 of the receiver, as in the case of the transmitter 2, can comprise a quartz crystal resonator linked to a frequency synthesiser (not shown). In these conditions, the intermediate signal IF obtained at the output of the mixer 33 has a triangular linear frequency variation just as in the case of the captured chirp signal. This signal is filtered in a traditional low-pass filter 35 before sampling the filtered intermediate signal in a sampler 36. This sampler 36 is clocked by a timing signal CK coming from the local oscillator 34. This timing signal CK can have a frequency, for example, equal to 1625 MHz coming from the output of a series of dividers (not shown), which are linked to a 26 MHz quartz crystal resonator of the local oscillator 34.

The sampled signal coming from the sampler 36 is supplied to a logic unit 37, the purpose of which is to determine a frequency error, a synchronisation state, a demodulation of the data. In particular a phase error $\Delta\varphi$ and a frequency error $\Delta f$ in relation to the captured chirp signal are controlled in the logic unit 37 in order to synchronise the oscillator of the receiver 3 with that of the transmitter 2 and allow a demodulation of the data to be conducted subsequently.

In this first embodiment, the logic unit 37 comprises an assembly 38 of m pairs of discrete Fourier transform blocks, chirp DFT1 and chirp DFT2, which are arranged for operation in parallel. The number m is higher than or equal to 1 and it should be noted that the higher the number m, the quicker the synchronisation phase becomes with fewer successive acquisitions. A first chirp block DFT1 of each pair is provided for the acquisition in relation to the positive slope of frequency variation of the captured chirp signal. This acquisition by the first chirp block DFT1 operates in a first half-cycle of the duration of a frequency variation cycle of the chirp signal, i.e. of the intermediate signal IF. A second chirp block DFT2 of each pair is provided for the acquisition in relation to the negative slope of frequency variation of the captured chirp signal. This acquisition by the second chirp block DFT2 operates in a second half-cycle of the duration of a frequency variation cycle of the chirp signal, i.e. of the intermediate signal IF. Different partial discrete Fourier transforms of chirp DFT1 of the frequency ramps of positive slope and of chirp DFT2 of the frequency ramps of negative slope are thus performed.

On receipt of the sampled intermediate signal, each block chirp DFT1 and chirp DFT2 of the different pairs of the assembly 38 perform in parallel a DFT projection on a core of n vectors with frequency ramps with a defined temporal phase shift between each DFT pair. These frequency ramps are a function of the frequency variation of the intermediate signal at the image of the chirp signal.

FIG. 5 actually shows the frequency ramps of n projection vector bins on a half-cycle for chirp DFT1 and on another half-cycle for chirp DFT2. The number n of bins can be relatively low, for example, in the order of 256. As may be seen, the frequency variation cycle of the chirp signal, i.e. of the intermediate signal, for each phase of the core of the DFT, is divided into m phases in the time corresponding to m pairs of chirp blocks DFT1 and DFT2. The ramps (bins) of chirp DFT1 of the positive slope and the ramps of chirp DFT2 of the negative slope in phase 1 are phase-shifted in the time of a duration T/m in relation to the ramps (bins) of chirp DFT1 of the positive slope and the ramps of chirp DFT2 of the negative slope in phase 2. T defines the duration of the frequency variation cycle of the chirp signal and m represents the number of pairs of the assembly 38. This is repeated successively until the m-th pair of blocks of chirp DFT1 and chirp DFT2.

It should be noted that each successive acquisition in the sampler 36 is performed in such a way that the modulation phase of the received chirp signal is expediently run through. This allows m phases of the assembly 38 to run through all the possible phases in order to better approach the phase of the modulation of the transmitter. The lower the number m of the DFT pairs, the higher the number of successive acquisitions. This signifies that for a number m equal to 1 or 2 or 4, a single acquisition of the signal is insufficient to allow synchronisation of the receiver, since the phase error between the modulation of the transmitter and the local projection can be too great.

As a time phase shift is performed between each pair of chirp blocks DFT1 and DFT2, one of the m pairs is able to detect frequency peaks above a determined threshold, as shown in FIG. 4. As each pair comprises a first chirp block DFT1 for the positive slope of the chirp signal and a second chirp block DFT2 for the negative slope of the chirp signal, a first peak at the frequency fd1 is detected above the threshold for the first block and a second peak at frequency fd2 is detected above the threshold for the second block. The frequency fd1 is below an intermediate or mean frequency fm, whereas frequency fd2 is above the intermediate or mean frequency fm.

Between two successive acquisitions ACQUIS N and ACQUIS N+1 shown in FIG. 2, there is a calculation phase to determine frequency and phase errors. In the calculation phase in a processing unit 39 linked to the different pairs of chirp blocks DFT1 and DFT2 of the assembly 38, a mean of two abscissas at frequency fd1 and fd2 is determined to determine a frequency error $\Delta f=(fd1+fd2)/2$ supplied at the output of the logic unit as error f0. A phase error $\Delta\varphi$ is also determined, being equal to the distance between one of the peaks and the mean $\Delta f$. This phase error is $\Delta\varphi=|fd1-\Delta f|=|fd2-\Delta f|$.

In the case of this first variant of the communication process and the calculation in parallel associated with m different chirp blocks DFT1 and DFT2, the synchronisation time of the receiver is very short. In contrast, as several calculations are performed at the same time by all the pairs, a slightly higher consumption is confirmed in relation to that described for the second variant of the communication process below.

The logic unit 37 is, of course, also able to supply a synchronisation state as discussed below in the modulation and demodulation phase, as well as demodulated data. These data can be demodulated in the logic unit 37, as described in relation to FIGS. 1 and 2 of the European patent application EP 2 469 783 A1, which is cited and incorporated herein by reference.

Figure 6:
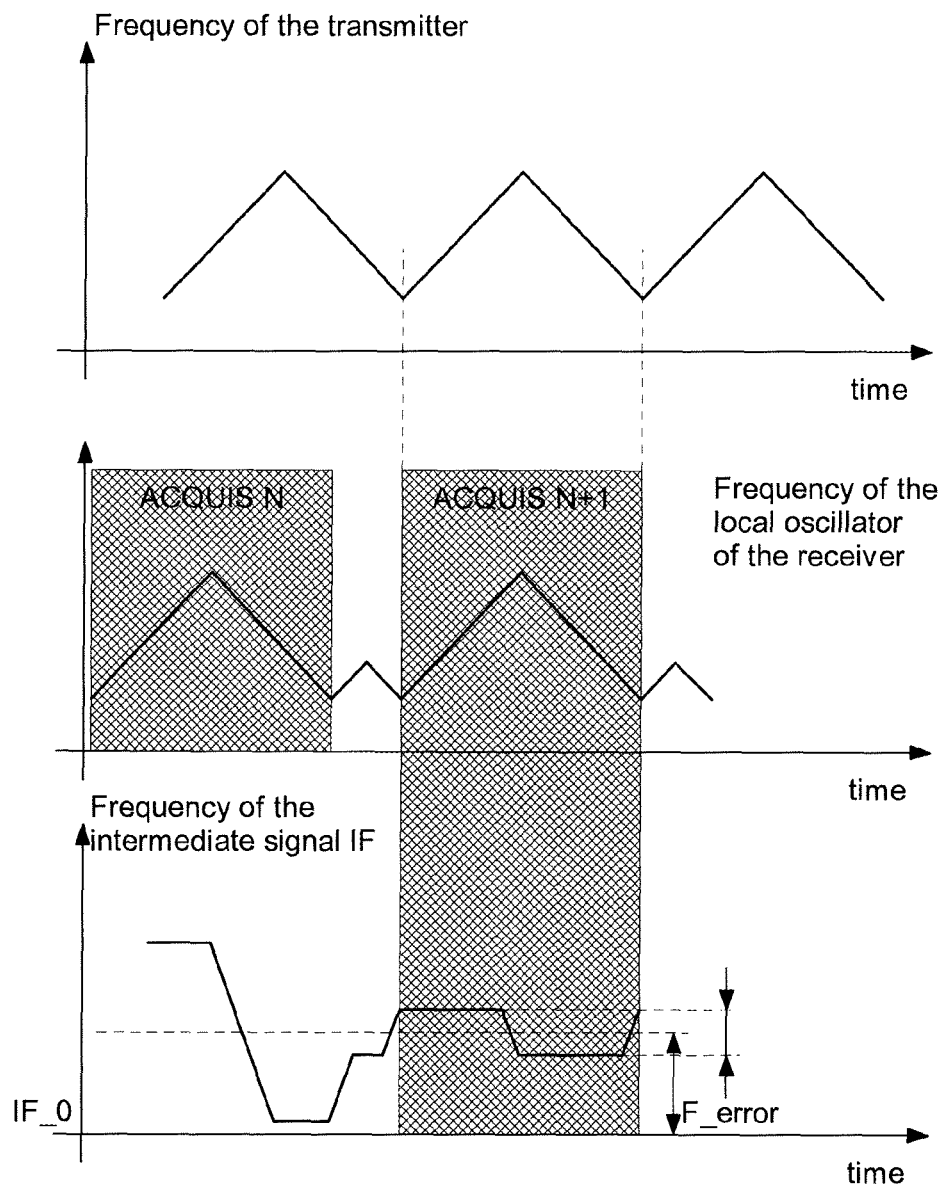
FIG. 6 shows several graphs over time of the frequency of the chirp signal transmitted by the transmitter, of acquisitions between each beginning and end of a cycle of the chirp signal in the receiver and of the intermediate frequency after conversion in the receiver according to a second variant of the communication process of the invention.

A second variant of the communication process is explained with reference to FIGS. 6 and 7. FIG. 6 shows several graphs in the synchronisation phase over time of the frequency variation of the chirp signal transmitted by the transmitter, of acquisitions between each beginning and end of a frequency variation cycle of the chirp signal in the receiver and of the intermediate frequency after conversion in the receiver. It should be noted that according to the second practical example of the communication system, the local oscillator supplies a modulated oscillating signal to the image of the chirp signal in order to obtain constant frequencies of the intermediate signal once the conversion has been performed after synchronisation.

The receiver is provided to regularly change the phase of the modulation or the triangular frequency variation until the oscillating signal supplied by the oscillator to the mixer is in phase with the chirp signal. Each acquisition of duration T in the receiver preferably begins at the beginning of each period at low frequency value and terminates at the end of said frequency variation cycle at low frequency value. However, each frequency variation cycle can begin at a high frequency value and terminate at the end of the period at the high frequency value. Thus, there must be a phase shift for generation of the oscillating signal to begin a new acquisition until synchronisation of the signals.

Two discrete Fourier transforms are performed in the logic unit of the receiver. A first discrete Fourier transform is performed for the positive slope of the oscillating signal during the first frequency variation half-cycle. A second discrete Fourier transform is performed for the negative slope of the oscillating signal during the second frequency variation half-cycle. When a peak higher than a given noise threshold is detected on each result of the discrete Fourier transforms, a frequency error and a phase error between the transmitter and the receiver are calculated. This frequency error $\Delta f$ is equal to the mean of the abscissas of the two peaks detected above the defined threshold. The phase error $\Delta\varphi$ is equal to the distance between one of the peaks and the mean, as explained previously with reference to FIG. 4.

As may be seen in FIG. 6, during the first acquisition ACQUIS N, the oscillating signal is phase-shifted from the chirp signal, which means that the frequency of the intermediate signal is not constant. In contrast, in the second acquisition ACQUIS N+1, the oscillating signal is in phase with the chirp signal, which means that over the first half-period the frequency of the intermediate signal is constant at a high value and over the second half-period the frequency of the intermediate signal is constant at a low value.

It should be noted that according to this second variant of the communication process, there must be several successive acquisitions over time to determine and correct the frequency error and the phase error to adapt the frequency of the local oscillator of the receiver. Once the synchronisation phase is ended, the demodulation phase can begin in the receiver.

Figure 7:
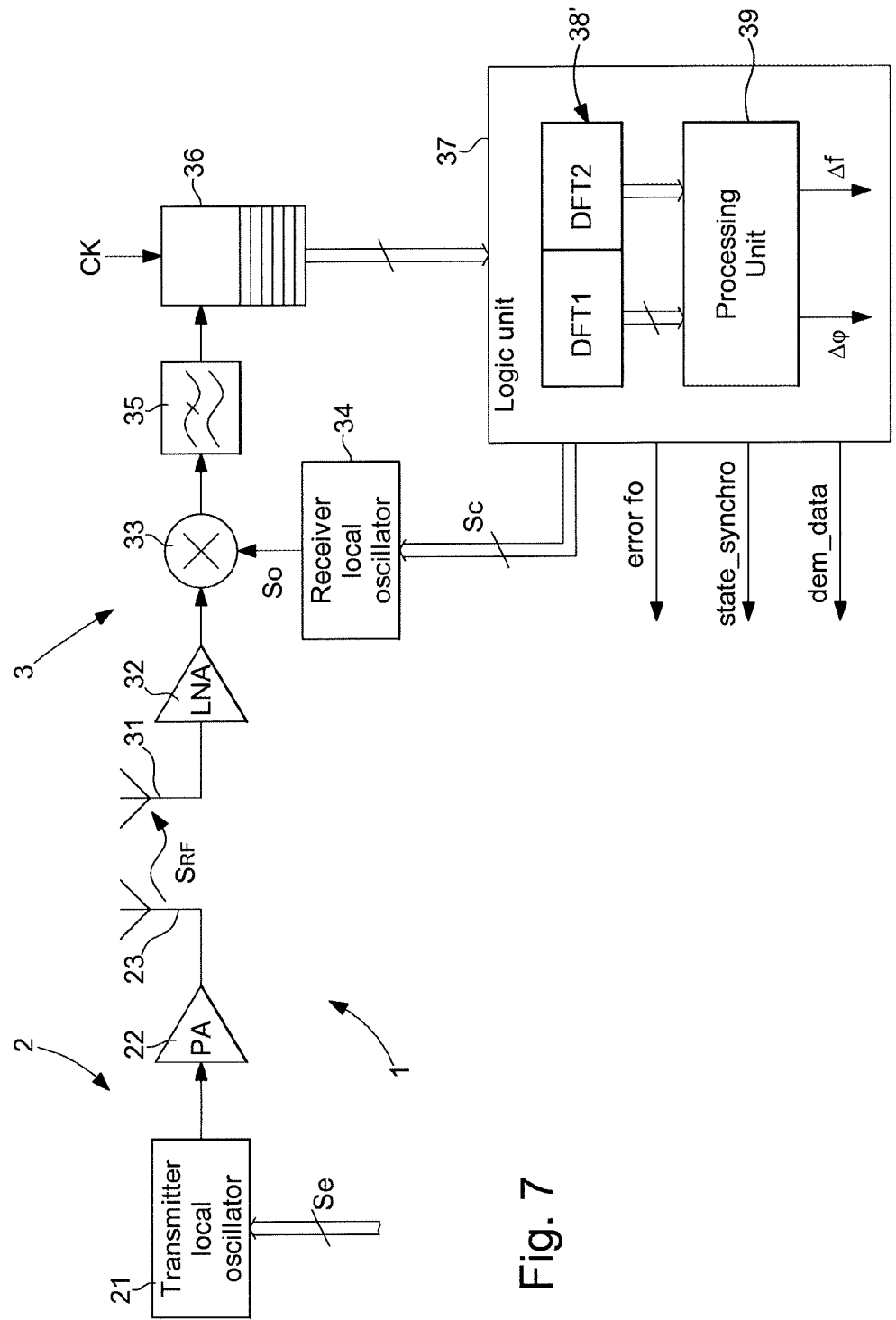
FIG. 7 shows a second practical example of the communication system for implementing the second variant of the communication process according to the invention.

FIG. 7 shows the second embodiment of the communication system 1 for implementing the communication process. As the majority of the components are identical to the communication system described with reference to FIG. 3, these component will not be described. It is principally the components of the logic unit 37 and their function that will be described.

The logic unit 37 receives the sampled signal coming from the sampler 36 in order to determine a frequency error f0, a synchronisation state, a demodulation of the data. Only one assembly 38' with two discrete Fourier transform blocks DFT1 and DFT2 is provided in the logic unit 37. As mentioned above, a first block DFT1 performs a DFT projection on a core of n vectors for the first half-cycle of acquisition of the positive slope of frequency variation. A second block DFT2 performs a DFT projection on a core of n vectors for the second half-cycle of acquisition of the negative slope of frequency variation. A single calculation is performed at the same time during each acquisition. Once a peak is detected after each DFT1 and DFT2 block in the processing unit 39, the frequency error $\Delta f$ and the phase error $\Delta\varphi$ are determined, as indicated above.

As mentioned above, the data can be demodulated in the logic unit 37, as described in relation to FIGS. 1 and 2 of the European patent application EP 2 469 783 A1, which is cited and incorporated herewith by reference.

In the case of this second variant of the communication system, the synchronisation time of the receiver is longer than in the first variant of the communication process. In contrast, an electric power consumption is much lower than with the first variant of the communication process.

Once the receiver is synchronised in the first variant or the second variant of the communication process, the modulation and demodulation phase can begin in the communication system according to the first or second practical example of FIG. 3 or 7.

Figure 8:
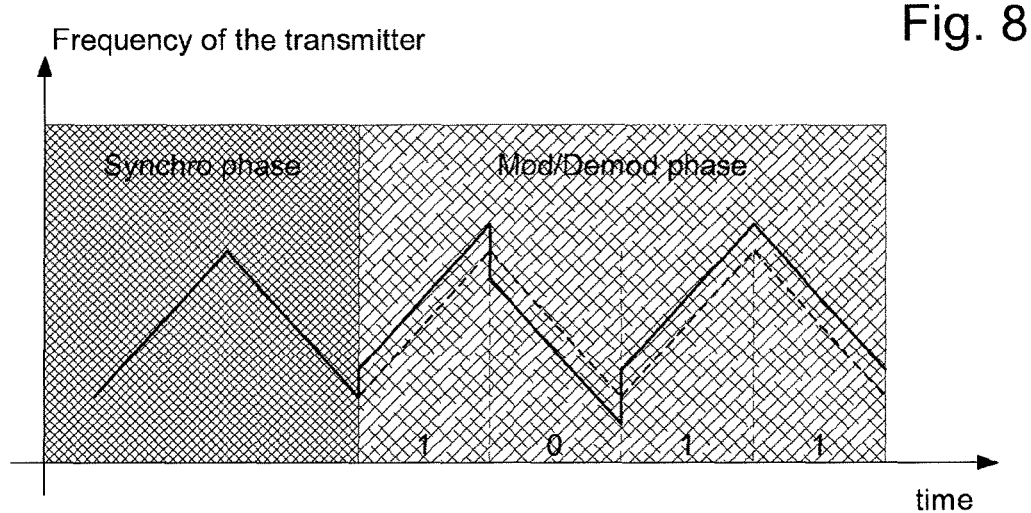
FIG. 8 shows a first variant of the chirp signal transmitted by the transmitter for the synchronisation phase and the modulation or demodulation phase for the communication process according to the invention.

FIG. 8 shows a first variant of the chirp signal transmitted by the transmitter for the synchronisation phase and the modulation or demodulation phase for the first variant or the second variant of the communication process. Each data symbol for the modulation and demodulation phase can be defined by a single logic state "1" or "0" or by a binary word of a succession of logic states "1" or "0".

According to a first variant, it can be provided to keep the frequency of the oscillating signal supplied by the local oscillator of the receiver constant, as for the first practical example of the communication system. However, it can also be conceivable to have the frequency of the oscillating signal varying like that of the received chirp signal, as for the second practical example of the communication system.

The transmitter transmits a chirp signal with a linearly variable frequency, as shown in FIG. 1 for the synchronisation phase. For the modulation phase from the transmitter, a coding of the data is performed in the chirp signal adding to each half-cycle a frequency offset with several values, which represent the instants of the information to be transmitted. The phase of the data is synchronised on that of the triangular signal, as shown in FIG. 8. In a first half-cycle on the positive slope of frequency variation a constant frequency offset is added to define a logic state "1", whereas for the second half-cycle on the negative slope of frequency variation a constant frequency offset is withdrawn to define a logic state "0". This can be the same frequency offset to be added or withdrawn to define each logic state of the data to be coded, but a different offset may also be conceivable.

Figure 9:
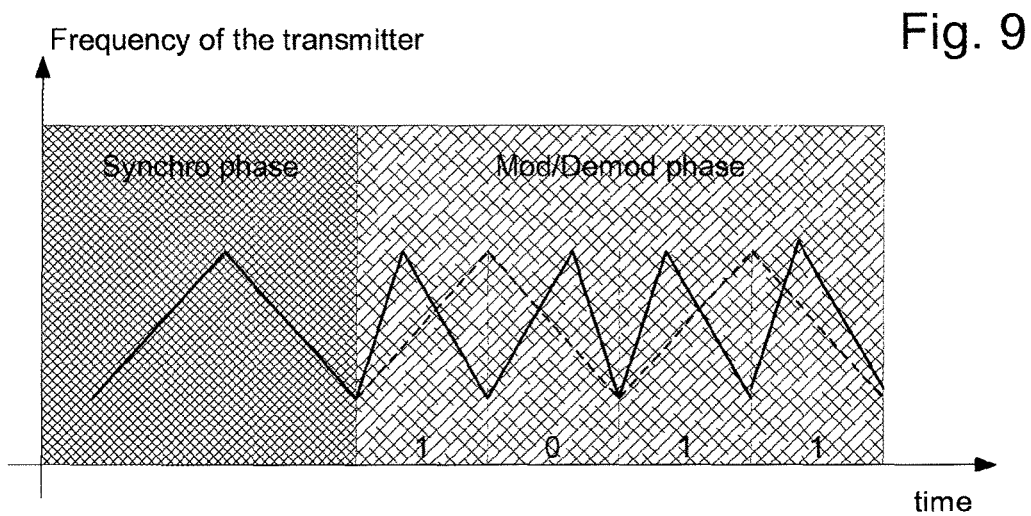
FIG. 9 shows a second variant of the chirp signal transmitted by the transmitter for the synchronisation phase and the modulation or demodulation phase for the communication process according to the invention.

FIG. 9 shows a second variant of the chirp signal transmitted by the transmitter for the synchronisation phase and the modulation or demodulation phase for the first variant or the second variant of the communication process.

For this type of coding, asymmetric frequency slopes are provided in each half-cycle of the chirp signal to define either a logic state "1" or a logic state "0". In each half-cycle of the chirp signal following the synchronisation phase each logic state is therefore defined by a first positive slope of frequency variation followed by a second negative slope of frequency variation, which is different in absolute values from the first positive slope.

As shown in FIG. 9, the logic state "1" in the first half-cycle of the chirp signal is defined by a first positive slope of frequency variation larger than the second negative slope of frequency variation in absolute values. In contrast, the logic state "0" in the second half-cycle of the chirp signal is defined by a first positive slope of frequency variation smaller than the second negative slope of frequency variation in absolute values.

In this second variant of data coding, it is noted that the frequency adaptation for the coding of the data is performed without jumps in frequency. This enables use of a 1-point PLL modulator, which is easy to use and also reduces consumption in the communication system.

With a constant frequency of the oscillating signal, the receiver can also perform a signal acquisition per transmitted symbol. In the logic unit, the receiver can project the received vector on n types of expected vectors. To follow the phase of the transmitter precisely, 3·n projections are performed in parallel, i.e. an "early" projection, a "current" projection and a "late" projection. The phase of the acquisitions is corrected to obtain the maximum projection energy on the "current" middle phase.

According to another variant the frequency of the oscillating signal supplied by the local oscillator of the receiver is modulated. In this case, the modulation illustrated in FIG. 8 can be advantageously used. The receiver performs a single acquisition per transmitted symbol and projects a received vector on n types of expected vectors. As in this case, the expected vector corresponds to a sinusoidal signal of determined frequency, where the middle frequencies of the transmitter and the receiver are locked, the projection corresponds to the calculation of the DFT on a single bin of clearly determined value.

There can also be a certain phase and frequency deviation between the transmitter and the receiver over the course of time. To follow the phase of the transmitter precisely, three projections are performed in parallel, i.e. an "early" projection, a "current" projection and a "late" projection. The phase of the triangular modulation signal of the local oscillator is corrected to obtain the maximum projection energy on the "current" middle phase. A control of the energy in the three phases is performed to follow the phase of the received chirp signal. This occurs at the end of the synchronisation phase or just before or also during the modulation and demodulation phase of the signals.

It is, of course, absolutely appropriate to design a transmitter-receiver to transmit a frequency modulation chirp signal and to receive another chirp signal. Every transmitter-receiver can work in accordance with the first and second variants of the communication process mentioned above.

Working from the description that has just been given, several variants of the communication process and system can be conceived by a person skilled in the art without departing from the framework of the invention defined by the claims. The modulation of the data can be performed for each logic state depending on the duration of the cycle of the chirp signal rather than over each half-cycle. The positive slope of frequency variation of the chirp signal can be larger or smaller than the negative slope of frequency variation of the chirp signal in absolute values. The coding of the data can be provided with asymmetric frequency slopes in each frequency variation cycle of the chirp signal. It can be provided to perform an amplitude modulation in the transmitted chirp signal for the modulation of the data.

What is claimed is:

1. A communication process for high-sensitivity and synchronous demodulation signals in a communication system, which comprises:

at least one transmitter to transmit a pseudo-periodic chirp-type signal of a period and at least one receiver to receive the chirp signal, wherein the transmitter comprises a local oscillator of the transmitter to generate a chirp signal to be transmitted and the receiver comprises a local oscillator of the receiver to generate an oscillating signal for frequency conversion of the received chirp signal by a mixer to supply an intermediate signal, wherein the process comprises a synchronization phase followed by a demodulation phase of a data signal, wherein following the synchronization phase, the chirp signal changes to a signal that includes in each period of the chirp signal of linear frequency variation a first cycle portion with a positive slope of the linear frequency variation and a second successive cycle portion with a negative slope of the linear frequency variation, wherein the receiver receives the chirp signal and converts the frequency of the chirp signal in the mixer by means of the oscillating signal generated by the local oscillator of the receiver in order to produce the intermediate signal, wherein the frequency of the oscillating signal is constant so that the frequency variation of the intermediate signal is due to the frequency variation of the chirp signal, wherein a filtered and sampled intermediate signal is supplied to a logic circuit of the receiver, which comprises an assembly of a number of pairs of discrete Fourier transform (DFT) blocks arranged for an operation in parallel and phase-shifted in relation to one another, where the number is a whole number higher than or equal to 1, wherein a first block of each pair is for an acquisition of the data in relation to the positive slope of the frequency variation of the chirp signal, whereas a second block of each pair is for the acquisition of the data in relation to the negative slope of the frequency variation of the chirp signal, and wherein a processor of the logic circuit receives a result of each discrete Fourier transform of the pairs of the assembly following at least one acquisition of the chirp signal and determines a frequency and/or a phase error between the transmitter and the receiver based on two peaks detected by at least one pair of the assembly above a defined noise threshold to synchronize the receiver before the demodulation phase of the data.

2. The process according to claim 1, wherein the first and second cycle portions of the chirp signal are identical and constitute the first and second half-cycles of the chirp signal.

3. The process according to claim 2, wherein at the end of the synchronization phase, the transmitter transmits a data coding chirp signal, wherein the coding is performed in each half-cycle of the frequency variation by adding a frequency offset to define a logic state "1" or subtracting a frequency offset to define a logic state "0".

4. The process according to claim 2, wherein at the end of the synchronization phase, the transmitter transmits a data coding chirp signal with asymmetric frequency variation slopes in each half-cycle of the chirp signal, wherein a logic state "1" is defined in a half-cycle by a first positive slope of the frequency variation larger than a second negative slope of the frequency variation in absolute values, whereas a logic state "0" in a half-cycle of the chirp signal is defined by a first positive slope of the frequency variation smaller than a second negative slope of the frequency variation in absolute values.

5. The process according to claim 1, wherein a duration of each acquisition of the data based on the chirp signal captured by the receiver is equal to the period of the frequency variation of the chirp signal.

6. The process according to claim 1, wherein several successive acquisitions of the captured chirp signal are performed depending on the number of pairs of DFT blocks, for which a lower the number of pairs of DFT blocks indicates a higher number of successive acquisitions for the synchronization phase of the receiver, and a time lag of the acquisition of data of the chirp signal captured by the receiver is constantly phase-shifted and of a duration equal to the period of the frequency variation of the chirp signal.

7. The process according to claim 1, wherein the pairs of DFT blocks are phase-shifted in relation to one another over a time of a duration based on the period per the number of pairs of DFT blocks.

8. The process according to claim 1, wherein a frequency error is determined in the processor based on a mean of the two peaks detected above the noise threshold.

9. The process according to claim 8, wherein the phase error is determined based on the distance between one of the detected peaks and the mean of the frequencies of the detected peaks.

10. The process according to claim 1, wherein a calculation phase of the frequency and/or phase error begins at the end of an acquisition phase and before the beginning of a successive acquisition.

11. The process according to claim 1, wherein at the end of the synchronization phase, the transmitter transmits a data coding chirp signal, wherein the coding is performed in each frequency variation by adding a frequency offset to define a logic state "1" or subtracting a frequency offset to define a logic state "0".

12. The process according to claim 1, wherein at the end of the synchronization phase, the transmitter transmits a data coding chirp signal with asymmetric frequency variation slopes in each frequency variation of the chirp signal, wherein a logic state "1" is defined with the positive slope in the first cycle portion, which is different from the negative slope in absolute values in the second cycle portion.

13. A communication system for implementing the communication process according to claim 1, wherein the communication system comprises the at least one transmitter to transmit a pseudo-periodic chirp-type signal of period and the at least one receiver to receive the chirp signal, wherein the transmitter comprises the local oscillator of the transmitter to generate the chirp signal to be transmitted and the receiver comprises the local oscillator of the receiver to generate the oscillating signal at constant frequency for the frequency conversion of the received chirp signal by the mixer to supply the intermediate signal with the frequency variation based on the received chirp signal, wherein the communication system additionally comprises a low-pass filter followed by a sampler timed by a timing signal supplied by the local oscillator of the receiver, wherein the communication system additionally comprises the logic circuit, which receives the intermediate signal comprising the assembly of the number of pairs of discrete Fourier transform (DFT) blocks arranged for an operation in parallel and phase-shifted in relation to one another, where the number is an integral higher than or equal to 1, wherein the first block of each pair is for the acquisition of the data in relation to the positive slope of the frequency variation of the chirp signal, whereas the second block of each pair is for the acquisition of the data in relation to the negative slope of the frequency variation of the chirp signal, and wherein the logic circuit additionally comprises the processor intended to receive the result of each discrete Fourier transform of the pairs of the assembly to determine the frequency and/or a phase error between the transmitter and the receiver.

14. A communication process for high-sensitivity and synchronous demodulation signals in a communication system, which comprises:

at least one transmitter to transmit a pseudo-periodic chirp-type signal of a period and at least one receiver to receive the chirp signal, wherein the transmitter comprises a local oscillator of the transmitter to generate a chirp signal to be transmitted and the receiver comprises a local oscillator of the receiver to generate an oscillating signal for frequency conversion of the received chirp signal by a mixer to supply an intermediate signal, wherein the process comprises a synchronization phase followed by a demodulation phase of a data signal, wherein following the synchronization phase, the chirp signal changes to a signal that includes in each period of the chirp signal of linear frequency variation a first cycle portion with a positive slope of the linear frequency variation and a second successive cycle portion with a negative slope of the linear frequency variation, wherein the receiver receives the chirp signal and converts the frequency of the chirp signal in the mixer by means of the oscillating signal generated by the local oscillator of the receiver in order to produce the intermediate signal, wherein the frequency of the oscillating signal varies in a similar manner to the frequency variation of the chirp signal, wherein a filtered and sampled intermediate signal is supplied to a logic circuit of the receiver, which comprises a pair of discrete Fourier transform (DFT) blocks, wherein a first block of the pair is for an acquisition in relation to the positive slope of the frequency variation of the chirp signal, whereas a second block of the pair is for the acquisition in relation to the negative slope of frequency variation of the chirp signal, and wherein a processor of the logic circuit receives a result of each discrete Fourier transform of the blocks of the pair to correct the phase-shift of the oscillating signal generated by the local oscillator after several successive acquisitions of the chirp signal until detection by the pair of DFT blocks of two peaks above a defined noise threshold to determine a frequency and/or a phase error between the transmitter and the receiver to synchronize the receiver before the demodulation phase of the data.

15. The process according to claim 14, wherein the first and second cycle portions of the chirp signal are identical and constitute the first and second half-cycles of the chirp signal.

16. The process according to claim 15, wherein at the end of the synchronization phase, the transmitter transmits a data coding chirp signal, wherein the coding is performed in each half-cycle of the frequency variation by adding a frequency offset to define a logic state "1" or subtracting a frequency offset to define a logic state "0".

17. The process according to claim 15, wherein at the end of the synchronization phase, the transmitter transmits a data coding chirp signal with asymmetric frequency variation slopes in each half-cycle of the chirp signal, wherein a logic state "1" is defined in a half-cycle by a first positive slope of the frequency variation larger than a second negative slope of frequency variation in absolute values, whereas a logic state "0" in a half-cycle of the chirp signal is defined by a first positive slope of the frequency variation smaller than a second negative slope of frequency variation in absolute values.

18. The process according to claim 14, wherein a duration of each acquisition of the data based on the chirp signal captured by the receiver is equal to the period of the frequency variation of the chirp signal.

19. The process according to claim 14, wherein each acquisition of the data based on the chirp signal captured by the receiver begins at a low frequency value or a high frequency value of the frequency variation of the chirp signal and is of a duration equal to the period of frequency variation of the chirp signal.

20. The process according to claim 14, wherein a frequency error is determined in the processor based on a mean of the two peaks detected above the noise threshold.

21. The process according to claim 20, wherein the phase error is determined based on the distance between one of the detected peaks and the mean of the frequencies of the detected peaks.

22. The process according to claim 14, wherein a calculation phase of the frequency and/or phase error begins at the end of an acquisition phase and before the beginning of a successive acquisition.

23. The process according to claim 14, wherein at the end of the synchronization phase, the transmitter transmits a data coding chirp signal, wherein the coding is performed in each frequency variation by adding a frequency offset to define a logic state "1" or subtracting a frequency offset to define a logic state "0".

24. The process according to claim 14, wherein at the end of the synchronization phase, the transmitter transmits a data coding chirp signal with asymmetric frequency variation slopes in each frequency variation of the chirp signal, wherein a logic state "1" is defined with the positive slope in the first cycle portion, which is different from the negative slope in absolute values in the second cycle portion.

25. A communication system for implementing the communication process according to claim 14, wherein the communication system comprises the at least one transmitter to transmit a pseudo-periodic chirp-type signal of period and the at least one receiver to receive the chirp signal, wherein the transmitter comprises the local oscillator of the transmitter to generate the chirp signal to be transmitted and the receiver comprises the local oscillator of the receiver to generate the oscillating signal at constant frequency for the frequency conversion of the received chirp signal by a mixer to supply the intermediate signal with the frequency variation based on the received chirp signal, wherein the communication system additionally comprises a low-pass filter followed by a sampler timed by a timing signal supplied by the local oscillator of the receiver, wherein the communication system additionally comprises logic circuit, which receives the intermediate signal comprising the pair of discrete Fourier transform (DFT) blocks, wherein the first block of the pair is for the acquisition of the data in relation to the positive slope of the frequency variation of the chirp signal, whereas the second block of the pair is for the acquisition of the data in relation to the negative slope of the frequency variation of the chirp signal, and wherein the logic circuit additionally comprises the processor intended to receive the result of the discrete Fourier transforms of the blocks of the pair to correct the phase-shift of the oscillating signal generated by the local oscillator to determine the frequency and/or a phase error between the transmitter and the receiver.

* * * * *